United States Patent [19]
Koch

[11] Patent Number: 5,894,924
[45] Date of Patent: Apr. 20, 1999

[54] ALTERNATIVE CD-ROM/DVD PACKAGING DEVICE

[76] Inventor: Hans G. Koch, 1100 SW. 27th St., Renton, Wash. 98055

[21] Appl. No.: 08/978,446

[22] Filed: Nov. 25, 1997

[51] Int. Cl.$^6$ ............................................. B65D 85/57
[52] U.S. Cl. .......................... 206/310; 206/307; 206/310; 206/308.1
[58] Field of Search ........................ 206/310, 307, 206/308.1, 493

[56] References Cited

U.S. PATENT DOCUMENTS

| | | | |
|---|---|---|---|
| 5,400,902 | 3/1995 | Kaminski | 206/310 |
| 5,402,882 | 4/1995 | Bandy et al. | 206/310 |
| 5,494,156 | 2/1996 | Nies | 206/310 |
| 5,573,120 | 11/1996 | Kaufman et al. | 206/310 |

Primary Examiner—Paul T. Sewell
Assistant Examiner—Jila Mohandesi
Attorney, Agent, or Firm—Christensen, O'Connor, Johnson & Kindness PLLC

[57] ABSTRACT

A holder for a compact disc. The holder includes a base approximating the size of a compact disc for nesting a compact disc. A centrally located rosette integrally cast with the base centers the CD. The rosette has engagement arms molded to and extending upwardly from the base for centering the CD, and further extending radially inwardly, creating a circular opening. It also includes a lid pivotally mounted on the base and having a centrally located retaining ring and button fastener for insertion into the circular opening of the rosette as the lid is moved from the open position to the closed position. With the lid in the closed position, the button fastener holds the CD firmly in place and additionally functions as a latch to retain the lid in the closed position.

9 Claims, 5 Drawing Sheets

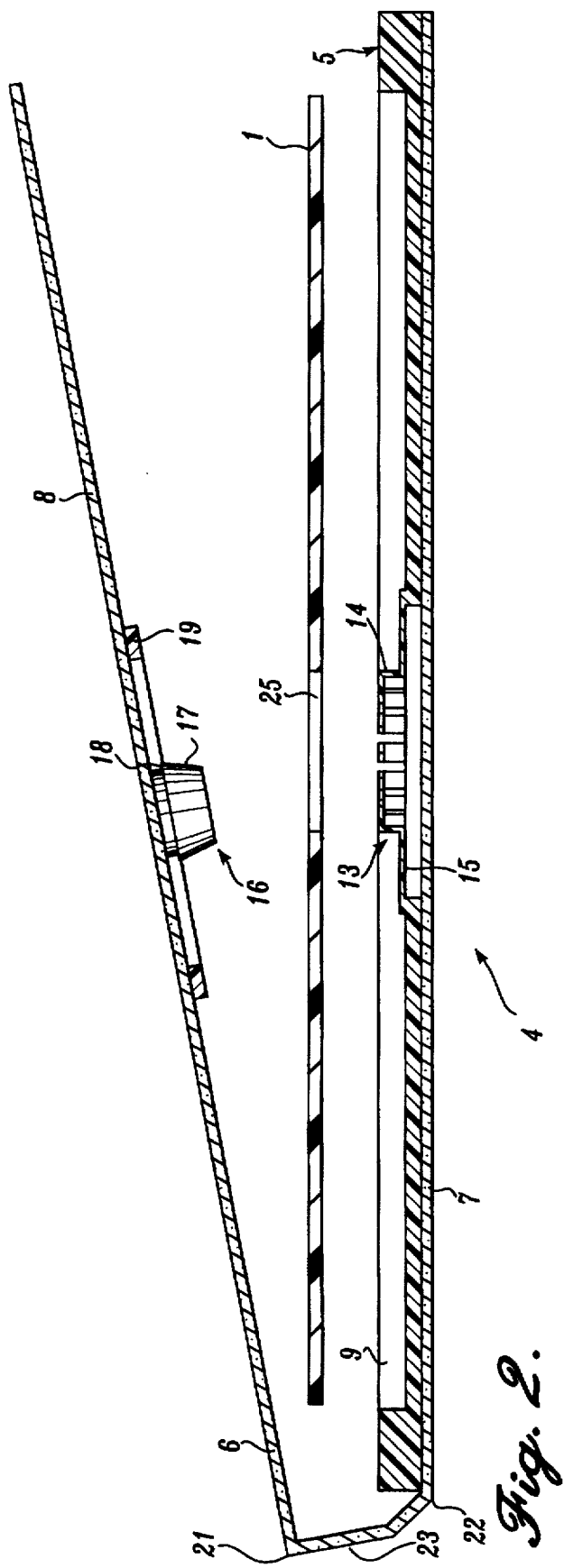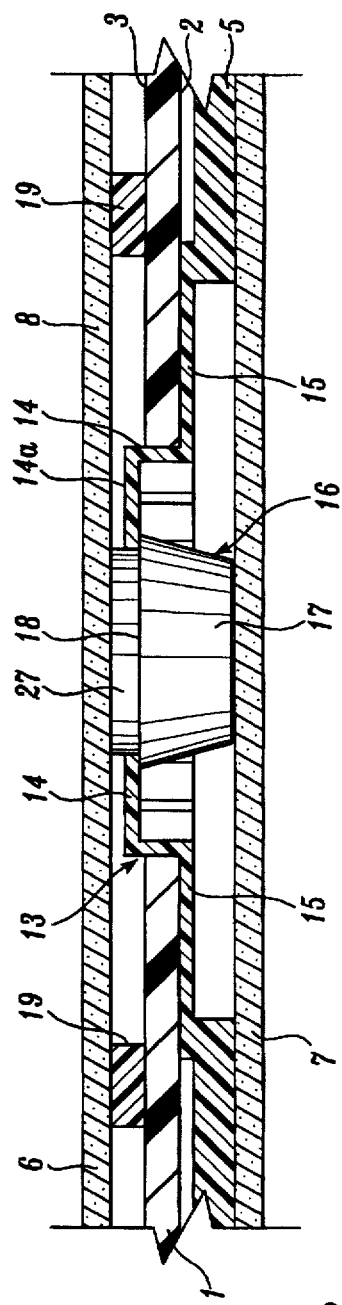
Fig. 2.
Fig. 3.

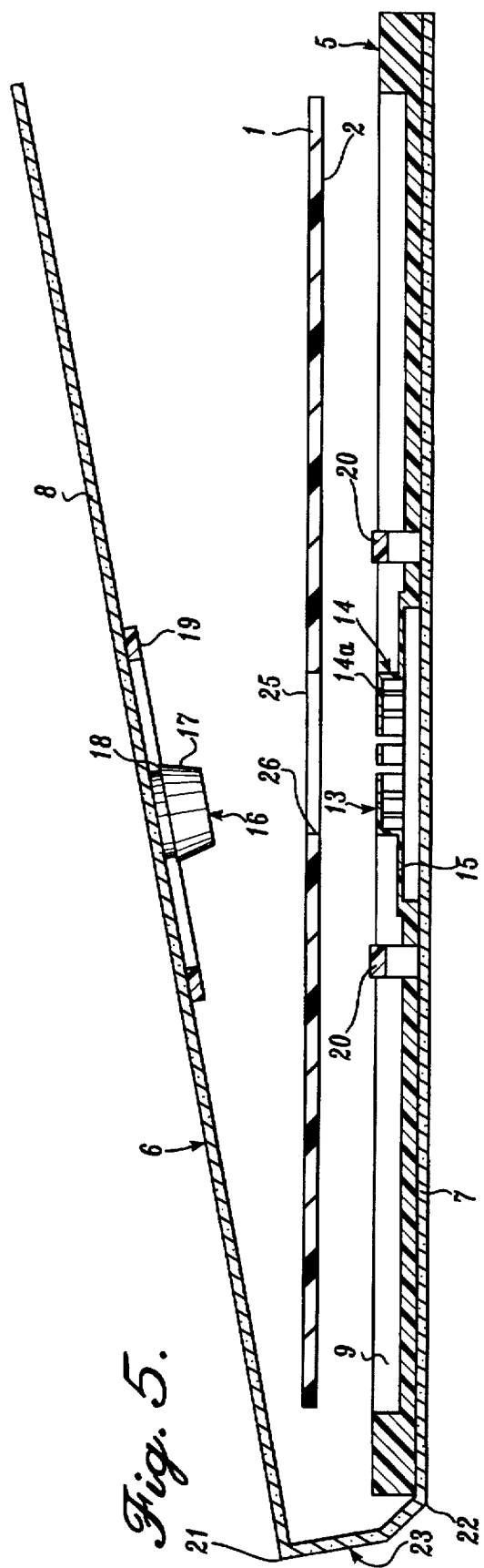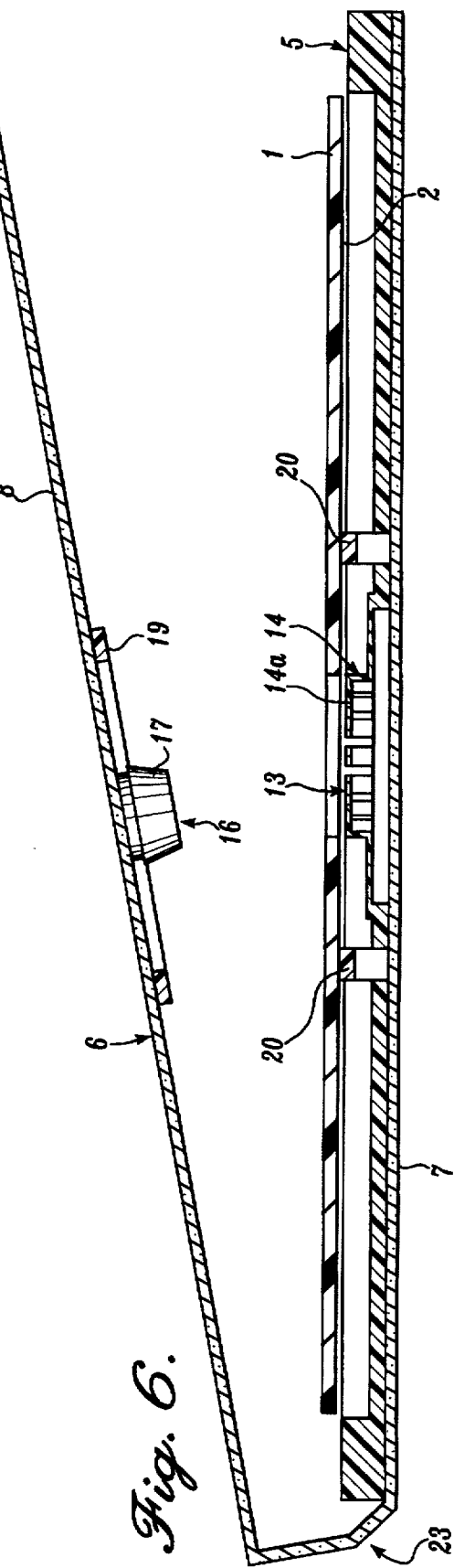

5,894,924

ALTERNATIVE CD-ROM/DVD PACKAGING DEVICE

FIELD OF THE INVENTION

The present invention relates generally to storage devices and, more particularly, for devices holding compact discs (CDs).

BACKGROUND OF THE INVENTION

With the growing use of compact digital media a variety of holders for shipping and storing CDs are available. One such holder has a rectangular plastic base with a centrally located hub on which the CD may be placed. The CD is frictionally retained on the hub by a plurality of radially outwardly biased and axially extending flexible segments. A lid is pivotally mounted on the base. To remove the CD from the holder, the lid is opened and the CD is held by placing the thumb and index finger on the edge of the CD and then lifting the CD from the hub by pressing the forefinger on the hub. The problem with these holders is that they are somewhat cumbersome to use and require a certain amount of force for CD removal.

Another type of holder has a base to which a rectangular top and bottom are mounted for rotation about a common axis. The CD is retained on a hub assembly mounted on the base. To remove the CD from the holder, the top is opened to a position where it engages the base. As the top is further opened, it causes the base to pivot upward from the bottom, permitting a pivoting member in the hub assembly to rotate, releasing the CD from the hub. These holders are more complex and more expensive to manufacture than the holders described above.

A third type of holder includes a base having a hub on which the CD is retained. A lid pivotally mounted on the base has an extractor with a barb, which disengages the CD and functions as a latch for the lid. To remove the CD from the holder, the lid is opened, permitting the barb of the extractor to disengage the CD from the hub. The barb of the extractor disengages the CD by drawing it upward on the hub until it is free of the hub. As it disengages the CD, the barb is in direct contact with the CD, creating a potential for scratches. An additional problem created is the potential for breakage of the protruding barb.

Accordingly, it is an object of this invention to provide an improved holder for CDs in which the CD is automatically disengaged from the base upon the opening of the lid by the user but which is relatively simple in design and inexpensive to manufacture.

It is another object of this invention to provide an improved holder for CDs in which the CD can be removed from the base without direct application of force to the CD by the user.

It is another object of this invention to provide an improved holder for CDs that provides CD removal with no or low stress on the CD.

It is another object of this invention to provide an improved holder for CDs in which the means to disengage the CD does not entail direct contact with the CD.

It is another object of this invention to provide an improved holder for CDs in which the means to disengage the CD, which also functions as positive closure, does not have a potential breakage problem.

It is another object of this invention to provide an improved CD holder which can be easily opened by a user even if he or she is unfamiliar with the device.

It is another object of this invention to provide a holder for CDs in which the lid and outer covering of the base can be constructed of cardboard, thereby reducing cost and providing a surface upon which information can be printed.

SUMMARY OF THE INVENTION

This invention is a holder for a compact disc. The holder includes a base having a centrally located rosette that centers the CD. A lid mountable on the base includes a centrally located button fastener and a centrally located retaining ring.

In accordance with a more detailed aspect of this invention, the holder includes a lid hingedly mounted on the base for movement between an open and a closed position. As the lid is folded over and closing force is applied by pressing downward on the center of the lid, a button fastener mounted on the inside of the lid is inserted into the rosette by the closing force. The button fastener has a tapered edge on one end for ease of insertion and a small shoulder on the other end for positive fastening into the rosette. The insertion of the button fastener into the rosette causes the rosette to expand slightly to contact the inner diameter of the CD, thereby applying a slight force to the inner edge, grasping and centering the CD. Concurrently, the closing force allows a retaining ring mounted concentrically to the button fastener to contact the CD, and hold the CD firmly in place. As the lid is lifted open, the button fastener is disconnected from the rosette and the retaining ring is lifted off the CD, leaving the CD resting freely in the base and ready for removal with or without finger indents molded into the base.

In accordance with another embodiment of this invention, the base also includes spring tabs molded or mounted on the base, which expand outwardly, elevating the CD for removal when the lid is in the open position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a sectional view of the holder with the lid open and the CD above the base;

FIG. 3 is an enlarged, partial sectional view of the holder with the lid in the closed position and the CD resting in the recess of the base;

FIG. 5 is a sectional view of the holder including the tabs with the lid open and the CD above the base;

FIG. 6 is a sectional view of the holder with the lid open and the CD resting on the spring tabs.

DETAILED DESCRIPTION OF THE INVENTION

Figure 1:
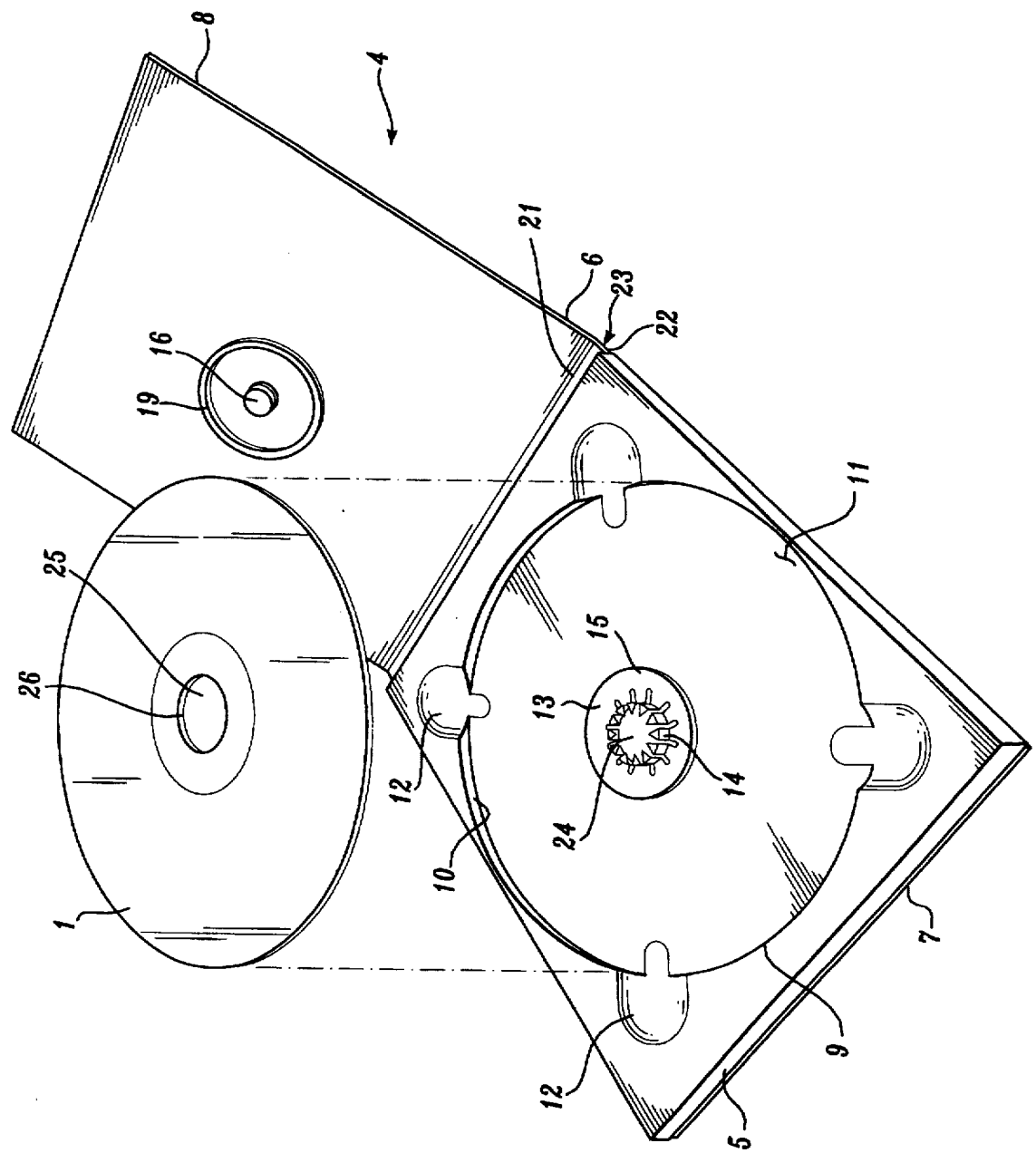
FIG. 1 is a perspective view of the preferred embodiment of the invention showing the lid in an open position and the CD exploded above the holder.

In FIG. 1, a holder for a CD is illustrated and generally designated by the number 4. As used herein the term compact disc (CD) is intended to encompass all types of readable and/or writeable optical compact discs, including music CDs, digital video discs (DVD), and CD-ROMs. The holder includes a base 5, preferably formed of plastic, and a cover 6, preferably constructed from heavy paper or paperboard. The cover is folded along fold lines 21 and 22 which divide the cover into three sections. The three sections are lid 8, integral hinge 23, and bottom covering 7.

In the preferred embodiment the base is molded from a suitable polymeric material, such as plastic. The base 5, which is attached to the bottom covering 7 by a suitable adhesive, includes a protective recess 9 which is adapted to receive a standard CD 1. The recess is formed by a downwardly extending circular wall 10 and a circular planar bottom surface 11. For access to the edges of the CD for removal purposes, the base further includes two sets of diametrically opposing pairs of indents 12 formed in the base at the periphery of the recess 9. The indents extend downwardly from the upper surface of the base 5 and intersect the arcuate wall to expose edges of the CD when nested in the recess 9. Integrally cast with the base is a centrally located rosette 13. The rosette includes a circular ledge 15 and flexible arms 14 extending upward from the base 5 and arranged in a circular pattern for engaging the CD cutout 25. The arms 14 have segments 14a at their upper end that extend radially inward and collectively terminate to define a circular opening 24 in the rosette.

The lid 8 includes a centrally located button fastener 16 and a centrally located retaining ring 19, both of which are attached to the lid 8 with a suitable adhesive. The button fastener extends downwardly from the ring 19 and has a frustoconically shaped leading portion for ease of insertion into the circular opening 24 of the rosette 13. The leading portion 17 tapers upwardly and outwardly from the button face, which has a diameter less than the diameter of the opening in the rosette, to the outer circular edge of a shoulder 18 that has a diameter larger than the opening 24 in the rosette. Base 27 of the button fastener 16 is cylindrical and has a diameter that is still slightly larger than the diameter of the rosette opening 24. The base 27 extends upwardly from the shoulder 18 and is fastened to the bottom of the lid 8 by a suitable adhesive.

In order to insert a CD 1 into the holder, lid 8 is opened and the CD is placed over the recess 9 of the base 5 with the CD cutout 25 centered around the rosette 13. The outer diameter of the rosette 13 is slightly less than the diameter of the cutout 25 so that the rosette will pass through the cutout without resistance, both when the CD is inserted in and removed from the holder. Next, the lid is closed by folding the lid over the base. As the lid closes, the button fastener 16 is automatically aligned with the rosette 13. Closing force is applied by pressing downward on the outside center portion of the lid. The closing force inserts the button fastener 16 into the circular opening 24 of the rosette 13. The tapered leading portion 17 of the button fastener 16 engages the rosette opening 24 for ease of insertion. The shoulder 18 passes through the opening 24 and engages the bottom side of the rosette to positively fasten the button in the rosette 13. Because the diameter of the base 27 of the button fastener 16 is slightly larger than the diameter of the opening 24 in the rosette 13, a radially outwardly directed force is exerted on the radial segments of the arms 14 of the rosette. This causes a slight increase in the outer diameter of the rosette causing it to snugly engage the edge 26 of opening 25 in the CD, and thus securely retain it in place. Concurrently, the closing force allows the retaining ring 19 to contact the CD, and transfer the force from the retaining ring to the CD to the base 5, thereby holding the CD firmly in place in the recess 9. As shown in FIG. 3, when the lid is in the closed position, the retaining ring 19 rests against the upper surface 3 of the CD 1 and the lower surface 2 of the CD rests against the ledge 15 of the rosette 13.

In order to remove the CD from the holder, the lid 8 is swung toward an open position. As the lid is opened, the button fastener 16 is removed from the rosette 13, allowing the diameter of the rosette to return to its original dimension and disengaging the rosette from the CD opening. At the same time, the retaining ring 19 is lifted off the CD, leaving the CD resting freely in the recess 9 of the base and ready for removal.

Figure 4:
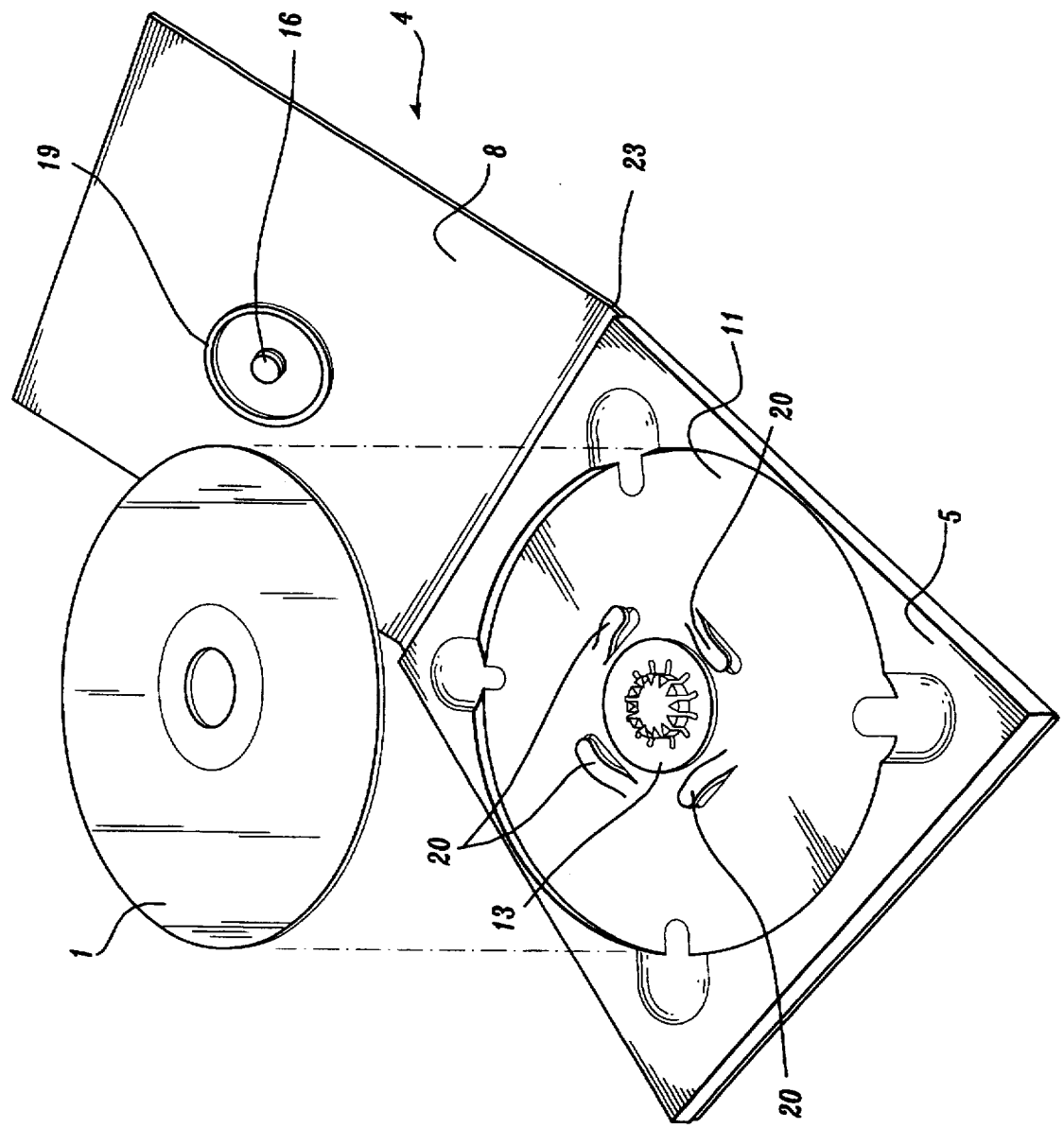
FIG. 4 is a perspective view of a second embodiment of the holder including the spring tabs.
Figure 7:
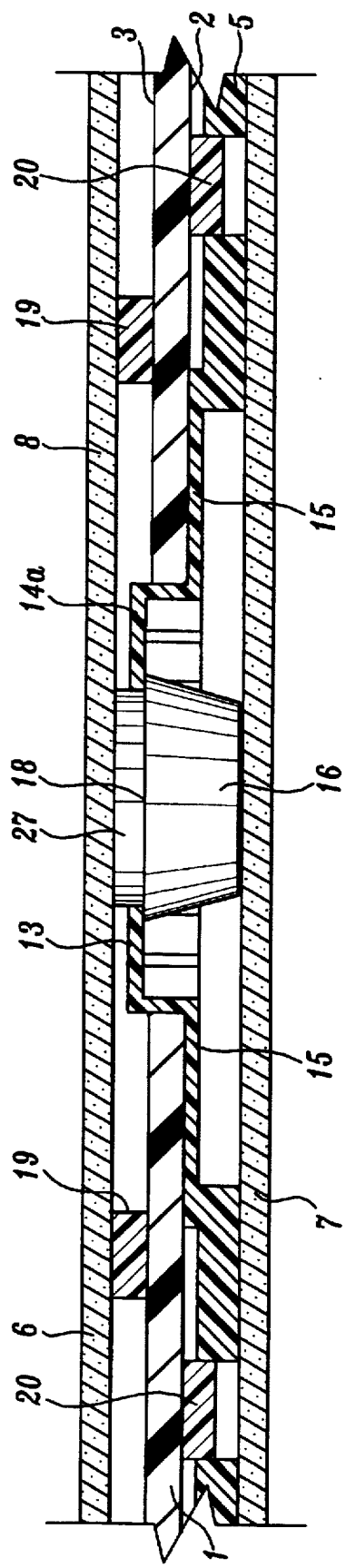
FIG. 7 is an enlarged, partial sectional view of the holder including the spring tabs with the lid in the closed position and the CD resting on the spring tabs.

Referring to FIGS. 4, 5, and 6, another embodiment is illustrated in which the base 5 has spring tabs 20 molded into the base, as shown in FIG. 4. Four tabs 20 are positioned 90° apart and spaced outwardly from the rosette. The tabs are capable of exerting an upwardly biasing force on the CD. In this embodiment, the CD 1 rests on the spring tabs 20 and is centered by the rosette 13, as shown in FIG. 6. When closing force is applied to the lid 8, the closing force is transferred from the retaining ring 19 to the CD 1 to the spring tabs 20, compressing the spring tabs and holding the CD firmly in place. As shown in FIG. 7, when the lid is in the closed position, the retaining ring 19 rests against the upper surface 3 of the CD 1 and the lower surface 2 of the CD rests against the ledge 15 of the rosette 13 and the compressed spring tabs 20. The button 16 and the rosette 13 function in the same manner as in the previous embodiment.

As the lid 8 is opened, the button fastener 16 is removed from the rosette 13 and the retaining ring is lifted off the CD 1. Concurrently, the upwardly biased spring tabs flex upwardly, elevating the CD and positioning the CD ready for removal.

While the preferred embodiment of the invention has been illustrated and described, it will be appreciated that various changes can be made therein without departing from the spirit and scope of the invention. For example, any of a variety of biasing means can be substituted for the spring tabs, such as coil springs and resilient polymeric foam buttons.

The embodiments of the invention in which an exclusive property or privilege is claimed are defined as follows:

1. A holder for a compact disc having a centrally located cutout, the holder comprising:

a base including a protective recess for nesting of the compact disc, a centrally located rosette integrally cast with the base, the rosette having arms extending upwardly from the base for centering and receiving the cutout of the compact disc, the arms having segments that extend radially inward terminating to collectively define a center fastener receiving opening;

a lid hinged to the base and including a button fastener for engaging the fastener receiving opening and positively engaging the rosette; and a retaining ring mounted on the lid for holding the compact disc firmly in place when the lid is in the closed position.

2. The holder of claim 1, further comprising spring means for elevating the compact disc for removal from the holder when the lid is in the open position.

3. A holder for a compact disc having a centrally located cutout comprising:

a base having a centrally located rosette mounted thereon, said rosette having arms extending upwardly from said base, said arms being arranged in a circular pattern for receiving the opening of a compact disc, said arms having radially inwardly extending segments that terminate to define a circular-shaped fastener receiving opening; and a lid having a centrally located fastener button thereon, said button being sized to positively engage the fastener receiving opening on said rosette when the lid is in a closed position over the base.

4. The holder of claim 3, wherein the outer diameter of the rosette is slightly less than the diameter of the CD opening and wherein the diameter of the fastener button is larger than the opening in the rosette, so that when said button engages the rosette an outward force is exerted on said segments and thus said arms so as to cause said arms to flex outwardly and increase the diameter of said rosette so that said rosette will frictionally engage the opening in said compact disc and retain said disc thereon.

5. The holder of claim 4, wherein said lid has an annular retaining ring thereon, said ring concentrically surrounding said button and extending downwardly from said lid, said ring bearing on the top of a CD when the lid is in a closed position.

6. The holder of claim 4, wherein said base has a means defining a recess surrounding said rosette thereon for receiving a compact disc.

7. The holder of claim 4, further comprising spring means mounted on said base for engaging the bottom of a compact disc located on said base and elevating said disc when the lid is in an open position spaced from the base.

8. The holder of claim 4, wherein said base and said lid are formed from paperboard and interconnected by an integral hinge.

9. The holder of claim 8, wherein said rosette and said fastener button are formed from a moldable polymeric material.

* * * * *